No. 647,654. Patented Apr. 17, 1900.
R. J. FLINN.
STEAM TRAP.
(Application filed Aug. 22, 1899.)
(No Model.)
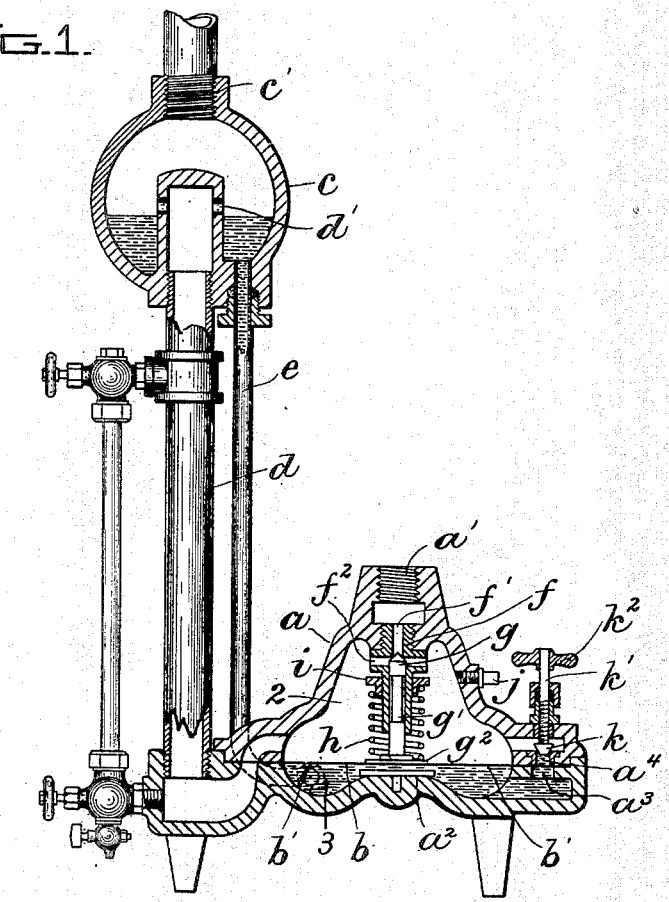
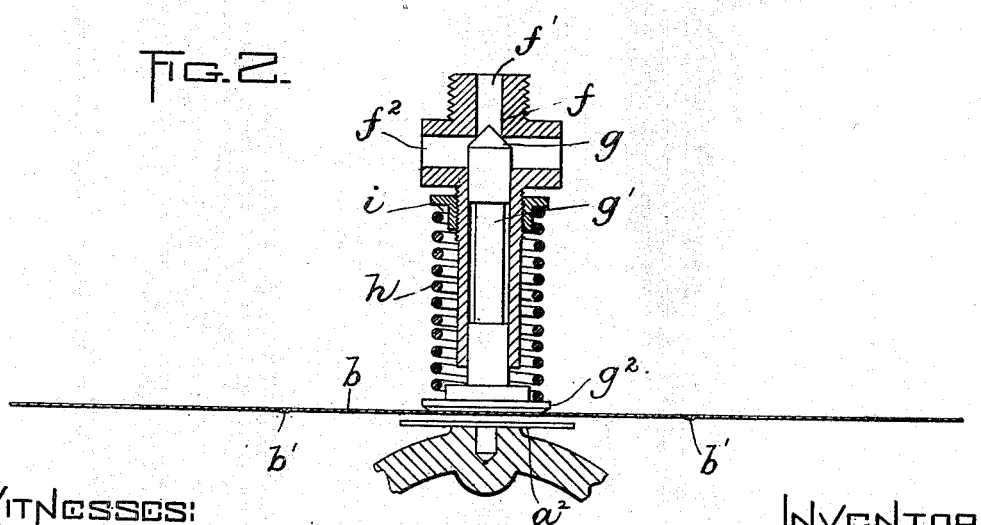
Witnesses:
E. Batchelder
Cornelius Beard Jr.
Inventor:
Richard J. Flinn
by Wright Brown & Quinby
attys.

UNITED STATES PATENT OFFICE.

RICHARD J. FLINN, OF BOSTON, MASSACHUSETTS.

STEAM-TRAP.

SPECIFICATION forming part of Letters Patent No. 647,654, dated April 17, 1900.

Application filed August 22, 1899. Serial No. 728,060. (No model.)

*To all whom it may concern:*

Be it known that I, RICHARD J. FLINN, of Boston, in the county of Suffolk and State of Massachusetts, have invented certain new and useful Improvements in Steam-Traps, of which the following is a specification.

This invention relates to steam-traps of the kind described in United States Letters Patent No. 514,883, granted to me February 13, 1894. In said Letters Patent is described a trap consisting of a body portion divided by a horizontal flexible diaphragm into two chambers or compartments connected by separate stand-pipes with an elevated condensing-chamber, which receives the steam and water of condensation. An outlet for the water of condensation leads from the compartment above the diaphragm, and a valve operated by fluctuations of the diaphragm and normally pressed open by a spring controls this outlet. The trap works by the differential action of two unequal columns of water in the two stand-pipes. The longer column of water exerts a pressure underneath the diaphragm, which tends to balance the pressure of the spring and of the shorter column of water above the diaphragm. When the former predominates, the valve is held closed and is opened when the shorter column, fed by the accumulating water of condensation, has risen to a sufficient height to overbalance with the assistance of the spring the pressure of the longer column. A portion of the water of condensation then flows off through the outlet from the trap and the valve again closes.

The present invention has for one object to provide means whereby the liquid-pressure on the two sides of the diaphragm may be equalized and the full force of the spring called into action to open the valve when it is desired to blow out the trap or temporarily accelerate the circulation therein for the purpose of removing obstructions or sediment.

Another object of the invention is to dispose of accumulations of air underneath the diaphragm which tend to affect the working of the trap.

The invention also has for its object to improve the structure of the valve and related parts.

With these objects in view the invention consists in certain novel features of construction and arrangement hereinafter described and claimed.

Of the accompanying drawings, Figure 1 represents a vertical sectional view of a steam-trap embodying my improvements. Fig. 2 represents a vertical section, on an enlarged scale, showing the valve and adjacent parts.

The same reference characters indicate the same parts in both figures.

Referring to the drawings, $a$ designates the body of the steam-trap, the same being divided by a thin flexible diaphragm or partition $b$ into two separate chambers or compartments 2 3.

$c$ is an elevated receiving and condensing chamber connected by a stand-pipe $d$ with the compartment 2 above the diaphragm and by a second stand-pipe $e$ with the compartment 3 below the diaphragm. The compartment 2 has an outlet $a'$, controlled by a valve $g$, which is supported by the diaphragm $b$ and normally pressed open by a spring $h$.

In operation the trap is connected to the steam system which it drains through an inlet $c'$ in the top of the chamber $c$, and the water of condensation flowing into the chamber fills the compartment 3 beneath the diaphragm and also fills the stand-pipe $e$ and the chamber $c$ up to the level of the inlet $d'$ to the stand-pipe $d$. The water overflows into the pipe $d$ and fills the compartment 2 above the diaphragm, furnishing a counter-pressure to that of the column of water in the pipe $e$, which acts underneath the diaphragm. When the column in the pipe $d$ has reached a point about midway of said pipe, the pressure of said column, together with that of the spring $h$ on the upper side of the diaphragm $b$, becomes equal to the pressure of the column in the pipe $e$ on the lower side of the diaphragm, and any further increase in the height of the water in pipe $d$ opens the valve and allows the water to escape through the outlet $a'$. When the level of the water in pipe $d$ has fallen below the point of equal pressures, the valve closes.

At $a^2$ the bottom of the trap is brought up close to the diaphragm $b$ to form a rest, which prevents excessive bending of the diaphragm by the action of the spring $h$ when unbalanced by pressure from beneath.

At $a^3$ I have shown a by-pass or small conduit connecting the compartments 2 and 3 on either side of the diaphragm $b$ in the body $a$ of the trap. At the top of the vertical portion of said by-pass is a valve-seat $a^4$. $k$ represents a valve adapted to open and close against said valve-seat and having a screw-stem $k'$ passing through a stuffing-box and provided at its upper end with a hand-wheel $k^2$.

During the normal working of the trap the valve $k$ is screwed down against its seat, so as to close the by-pass $a^3$. In case, however, the valve $g$ should become obstructed by a chip or sediment, so as to prevent its closing tight against its seat, the water would then become exhausted from the compartment 2 and steam would be allowed to escape. When such a condition arises, the valve $k$ in the by-pass $a^3$ is opened, so as to equalize the water-pressures on both sides of the diaphragm $b$. This allows the valve $g$ to open to its fullest extent under the full pressure of the spring $h$ and permits the steam to enter and blow out the obstruction. The valve $k$ is then closed and the trap allowed to resume its normal working. Another use for the by-pass $a^3$ and valve $k$ is to cause a circulation through the pipe $e$ and compartment 3 to prevent an accumulation of sediment beneath the diaphragm.

A difficulty sometimes encountered in traps of this description is the accumulation of a thin film of air underneath the diaphragm $b$, which hinders more or less the perfect working of the trap. This air when present ordinarily has no means of escape; but a feature of my present invention is to perforate the diaphragm $b$ with one or more very minute holes $b'$ $b'$, which will allow the air to pass through the diaphragm into the chamber 2, but are of insufficient size to permit the passage of any large quantity of water. This provides a minute permanently-open passage between the two compartments which will permit the passage of air and water from the lower to the upper compartment, so as to automatically equalize the liquid-pressures in the compartments after the condensation is shut off from the trap. Therefore the spring or its equivalent is free to exert its full force to depress the diaphragm and open the discharge-valve, so that steam remaining in the trap after the inlet-valve is closed will eject water remaining in the trap, thereby preventing freezing of the same when the trap is placed in an exposed position or location. When a freer communication between the two compartments than is afforded by said perforation is desired, the by-pass valve $k$ is opened, as above described. In practice I have found that two holes, one on either side of the center of the diaphragm, answer the purpose.

The valve $g$ is provided with a stem $g'$, which works in a guide $f$, screwed into the top of the trap-body $a$, and at the lower end of said stem is a flat head or flange $g^2$, which rests on the diaphragm $b$. The spring $h$ abuts at its lower end against the upper side of the flange $g^2$ and at its upper end is confined by an adjustable nut $i$, screwing on a threaded portion of the guide $f$. Said nut is preferably constructed as a split collar internally threaded and sprung around the guide, so as to turn with considerable friction thereon, and is formed with a milled edge. When it is desired to adjust the tension of the spring $h$, it may be done by removing a screw-plug $j$ from a hole in the side of the trap opposite the nut $i$ and inserting a screw-driver or other suitable appliance through said hole to engage the edge of the nut and turn the latter. In the upper end of the guide $f$ is formed a vertical passage $f'$, communicating with the outlet $a'$ and having at its lower end a seat for the valve $g$, and below said part is a horizontal passage $f^2$, connecting with said passage $f'$ and affording an inlet from the compartment 2.

I claim—

1. In a steam-trap the combination of two chambers or compartments separated by a flexible diaphragm, an outlet for the water of condensation leading from one of said compartments, a valve controlling said outlet, a spring or equivalent normally holding said valve open and adapted to be operated by differential liquid-pressures on opposite sides of the diaphragm, a by-pass connecting said compartments, whereby the said liquid-pressures may be equalized, and a valve controlling said by-pass.

2. In a steam-trap, the combination of two chambers or compartments separated by a flexible diaphragm, an outlet for the water of condensation leading from one of said compartments, a valve controlling said outlet, means, such as a spring normally holding said valve open and adapted to be operated by differential liquid-pressures on opposite sides of the diaphragm, a by-pass connecting said compartments whereby the said liquid-pressures may be equalized, and a valve controlling said by-pass, a minute permanently-open passage between the two compartments being provided to permit of a communication from the lower to the upper compartment.

3. In a steam-trap, the combination of a chamber or compartment having an outlet for the water of condensation, a valve controlling said outlet and having a stem provided with a flange, a guide for said stem, a nut adjustable on said guide, a spring interposed between said nut and the flange on the valve-stem, an opening in the wall of the compartment located opposite said nut for the insertion of an appliance to turn the nut, means for closing said opening, and means for operating the valve in opposition to the pressure of the spring.

In testimony whereof I have affixed my signature in presence of two witnesses.

RICHARD J. FLINN.

Witnesses:
C. F. BROWN,
E. BATCHELDER.